United States Patent
Koga et al.

(10) Patent No.: US 7,852,739 B2
(45) Date of Patent: Dec. 14, 2010

(54) POSITIONING SYSTEM MOUNTED ON PROBE MEMORY DEVICE AND POSITIONING METHOD THEREOF

(75) Inventors: Akihiro Koga, Tokyo (JP); Shinji Takakura, Yokohama (JP); Hiroaki Nakamura, Kawasaki (JP); Kohichi Kubo, Yokohama (JP); Takahiro Hirai, Yokohama (JP); Junichi Akiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 363 days.

(21) Appl. No.: 12/051,101

(22) Filed: Mar. 19, 2008

(65) Prior Publication Data

US 2008/0253269 A1 Oct. 16, 2008

(30) Foreign Application Priority Data

Mar. 27, 2007 (JP) .............................. 2007-080441

(51) Int. Cl.
*G11B 7/00* (2006.01)
(52) U.S. Cl. ..................................................... 369/126
(58) Field of Classification Search ................. 369/126, 369/44.27, 44.28; 324/754, 756
See application file for complete search history.

(56) References Cited

U.S. PATENT DOCUMENTS 7,502,304 B2 * 3/2009 Maeda et al. ............... 369/126
7,558,185 B2 * 7/2009 Cherubini et al. ........... 369/126
2007/0133358 A1 6/2007 Kubo et al.
2007/0274193 A1 11/2007 Akiyama et al.
2008/0068743 A1 3/2008 Kubo et al.

FOREIGN PATENT DOCUMENTS

| JP | 05-126518 | 5/1993 |
|---|---|---|
| JP | 09-026427 | 1/1997 |
| JP | 2003-346392 | 12/2003 |
| JP | 2007-048330 | 2/2007 |
| JP | 2007-080441 | 3/2007 |
| WO | 2005/020226 | 3/2005 |

OTHER PUBLICATIONS

Japanese Office Action dated Apr. 7, 2009 corresponding to U.S. Appl. No. 12/051,101, filed Mar. 19, 2008.
Japanese Office Action for JP2007-080441 mailed on Sep. 8, 2009.

* cited by examiner

*Primary Examiner*—Nabil Z Hindi
(74) *Attorney, Agent, or Firm*—Turocy & Watson, LLP

(57) ABSTRACT

A probe memory device carries out positioning with the use of a servo pattern provided in a servo area on a recording medium, and the recording medium and a probe head section are reciprocatingly moved (scan-moved) by vibration at a specific frequency in a one-axis direction. At this time, based on information from the servo area, relative position information between the recording medium and the probe head section is acquired, the relative position information is processed at a control section, and then, feedback control is carried out for carrying out position correction relative to an actuator.

12 Claims, 12 Drawing Sheets

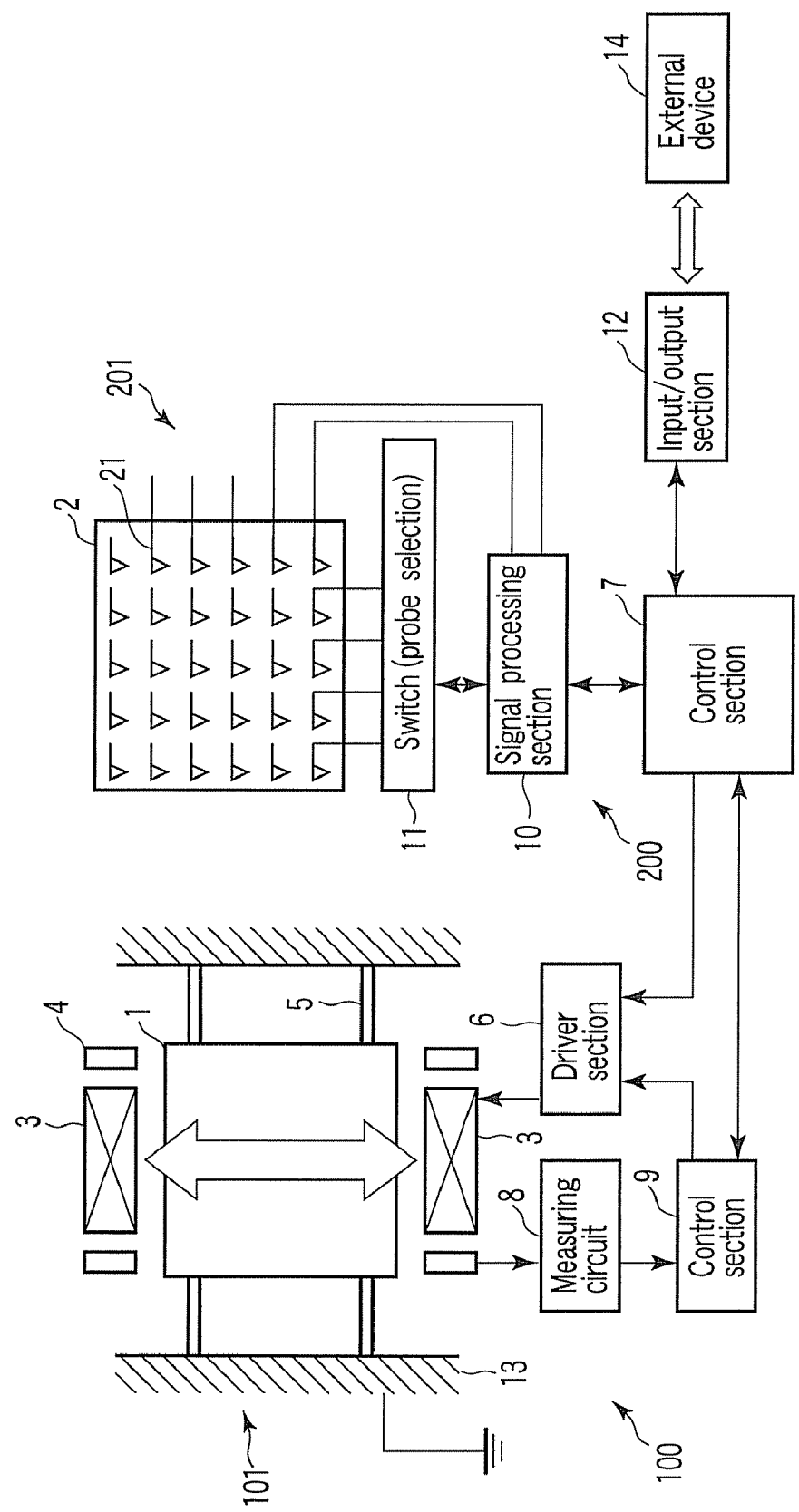
F I G. 1

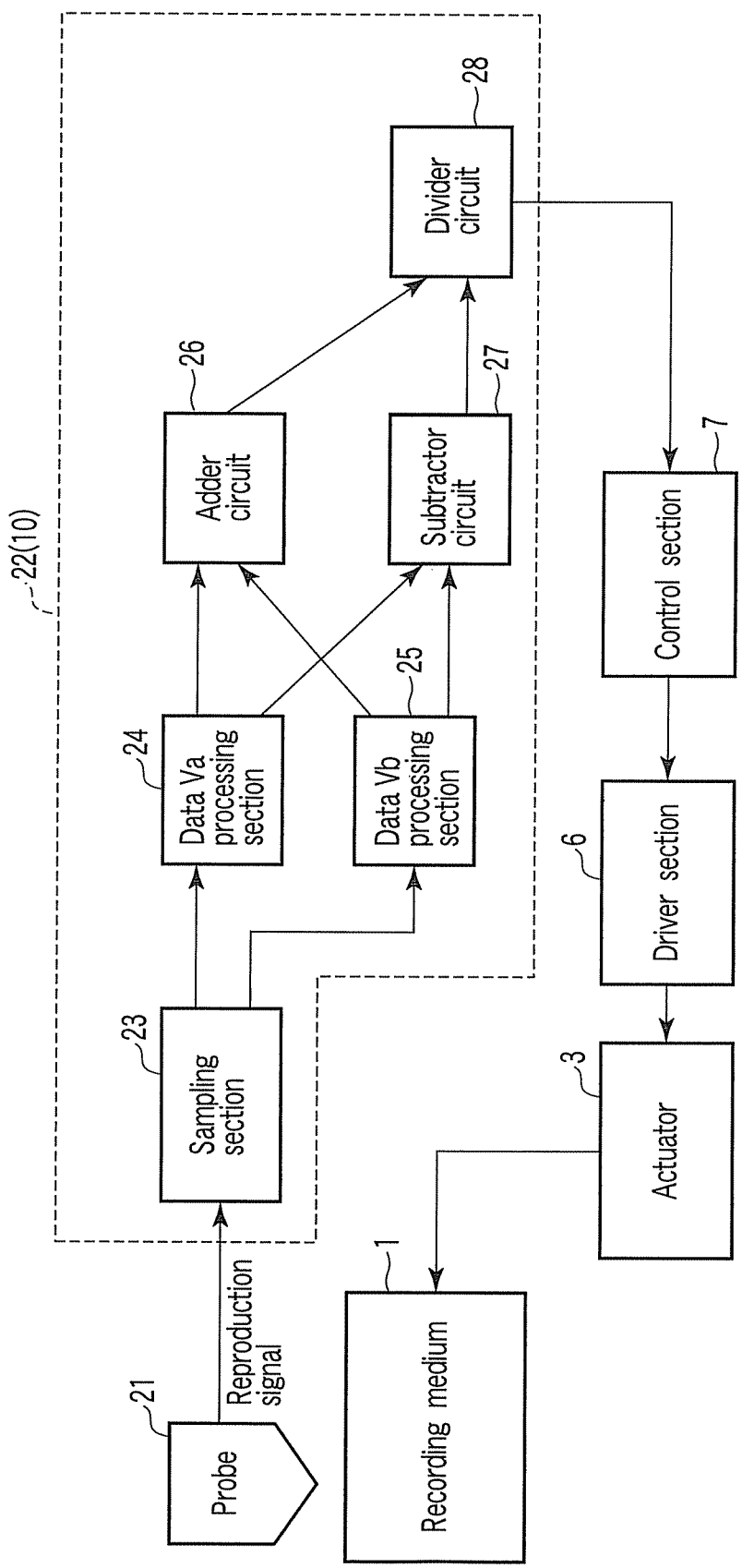
F I G. 5

POSITIONING SYSTEM MOUNTED ON PROBE MEMORY DEVICE AND POSITIONING METHOD THEREOF

CROSS-REFERENCE TO RELATED APPLICATIONS

This application is based upon and claims the benefit of priority from prior Japanese Patent Application No. 2007-080441, filed Mar. 27, 2007, the entire contents of which are incorporated herein by reference.

BACKGROUND OF THE INVENTION

1. Field of the Invention

The present invention relates to an apparatus and method for positioning a probe head for use in a probe memory device.

2. Description of the Related Art

In general, a memory device of an HDD (Hard Disk Drive) system is known as a recording device mounted on an electronic device. A general recording medium of HDD system is formed in a disk shape, and is rotated at a high speed by means of equipment such as a spindle motor. A probe head section for carrying out recording and reproduction to this recording medium is provided at a tip end of a turning arm, and is opposed to a recording face. In the recording medium, specific patterns are disposed at predetermined intervals from the center in a radiation shape. At this pattern portion, feedback information (servo patterns) relating to a position for positioning the probe head section relative to the recording medium is described.

In addition, according to Japanese Patent No. 3105987, there is proposed an information recording and reproducing apparatus provided with: a recording medium fixed to a coarse movement mechanism; and a movable probe disposed in opposite to the recording medium. With respect to the recording medium, a smooth recording layer is provided on a glass substrate, and the recording medium is placed on an XY-direction coarse movement mechanism that coarsely operates in an xy-plane. An xy-direction fine movement mechanism and a z-direction fine movement mechanism are disposed in an overlapped manner above the recording medium, and one probe opposite to a recording face is provided on a lower face thereof.

In such a recording medium, in order to achieve an increase in amount of information to be recorded, it is preferable to carry out integration such that a recording density is enhanced. However, it is not easy to find out a technique for achieving a high density, and it is thought to merely increase an area of a recording face, thereby achieving integration. However, for a practical use, there is a need for increasing an information writing speed and readout speed. A movable range and a movement speed of one probe is limited, and thus, it is presumed to use a number of probes.

In the case where a number of such probes are disposed in a matrix shape, the plurality of probes having a probe column must face, at the same time or continuously, to a plurality of portions (extremely small recording area) at which the plurality of probes carry out recording/readout. Thus, positioning must be precisely carried out relative to an XY direction.

With respect to this positioning, in JP-A 9-26427(KOKAI), for example, there is proposed a positioning apparatus for carrying out relative position control between a probe and a stage. This positioning apparatus is provided at a scaling section formed in a saw-tooth shape having predetermined pitches all around a recording area (recording face) of a square shaped recording medium fixed on a stage, and a position detecting probe is made proximal thereto. The position detecting probe is fixed to a probe side substrate that moves in an XY direction by means of a laminate type piezoelectric actuator. This positioning apparatus detects a displacement by means of probes proximal to four scaling sections.

In general, as in the positioning apparatus of JP-A 9-26427 (KOKAI) described previously, in the case where position detection in the XY direction is carried out, a pair of position identification patterns are provided, respectively, in two axis directions (XY directions) orthogonal to each other relative to the recording face. In other words, position identification patterns are provided all around the recording area. Conventionally, an approach for carrying out position detection at intervals has been also used in order to achieve time reduction of a position detecting process.

Further integration (downsizing) and an increase in recording area are required to increase a recording capacity of a square shaped recording medium that corresponds to a plurality of probe heads disposed in an arrayed manner described previously. In contrast, with respect to position detection in a Y direction, i.e., in a track direction, in particular, there is a need for carrying out continuous precise position detection while eliminating an undetected state.

BRIEF SUMMARY OF THE INVENTION

An embodiment of the present invention provides a positioning system mounted on a probe memory device, comprising: a recording medium having a square shaped recording area for recording information in a predetermined data direction, a first area and a second area provided, respectively, outside of any two opposing sides in the recording area, and a positioning pattern representing feedback information for carrying out positioning and provided in each of the first and second areas; a probe head section disposed in opposite to the recording medium and having a plurality of first probes disposed in matrix for recording, reproducing, and erasing information in the recording area, and a second probe for generating a reproduction signal that indicates a direction of the column from the positioning pattern of the first and second areas; and an actuator section which moves a relative position between the recording medium and the probe head section.

Further, the present invention provides a positioning method of a positioning system mounted on a probe memory device, comprising: using the probe memory device including: a probe head section at which a plurality of probes are disposed in an arrayed manner; and a recording medium on which information is written, read out, and erased by means of the probes disposed proximal to and in opposite to the probe head section; reciprocatingly moving the recording medium at a predetermined frequency with respect to one direction of degree of freedom; causing the probes to be proximal to positioning patterns of at least two columns for carrying out positioning, the positioning patterns being disposed in two servo areas provided at both sides on the recording medium sandwiching a recording area therebetween; generating a first reproduction signal and a second reproduction signal having saw-tooth waves whose phases are different from each other by 180 degrees; and dividing a differential value between the first reproduction signal and the second reproduction signal by an additive value of the first reproduction signal and the second reproduction signal, and when 0 is set, judging a proper position for carrying out the writing, the readout, and the erasing of the information.

BRIEF DESCRIPTION OF THE SEVERAL VIEWS OF THE DRAWING

FIG. 1 is a view showing a schematic configuration example of a probe memory device using an apparatus for positioning the probe memory device, according to a first embodiment of the present invention;

FIG. 5 is a view for explaining a position control system using a servo pattern, according to the first embodiment;

DETAILED DESCRIPTION OF THE INVENTION

Hereinafter, embodiments of the present invention will be described in detail with reference to the accompanying drawings.

Figure 2:
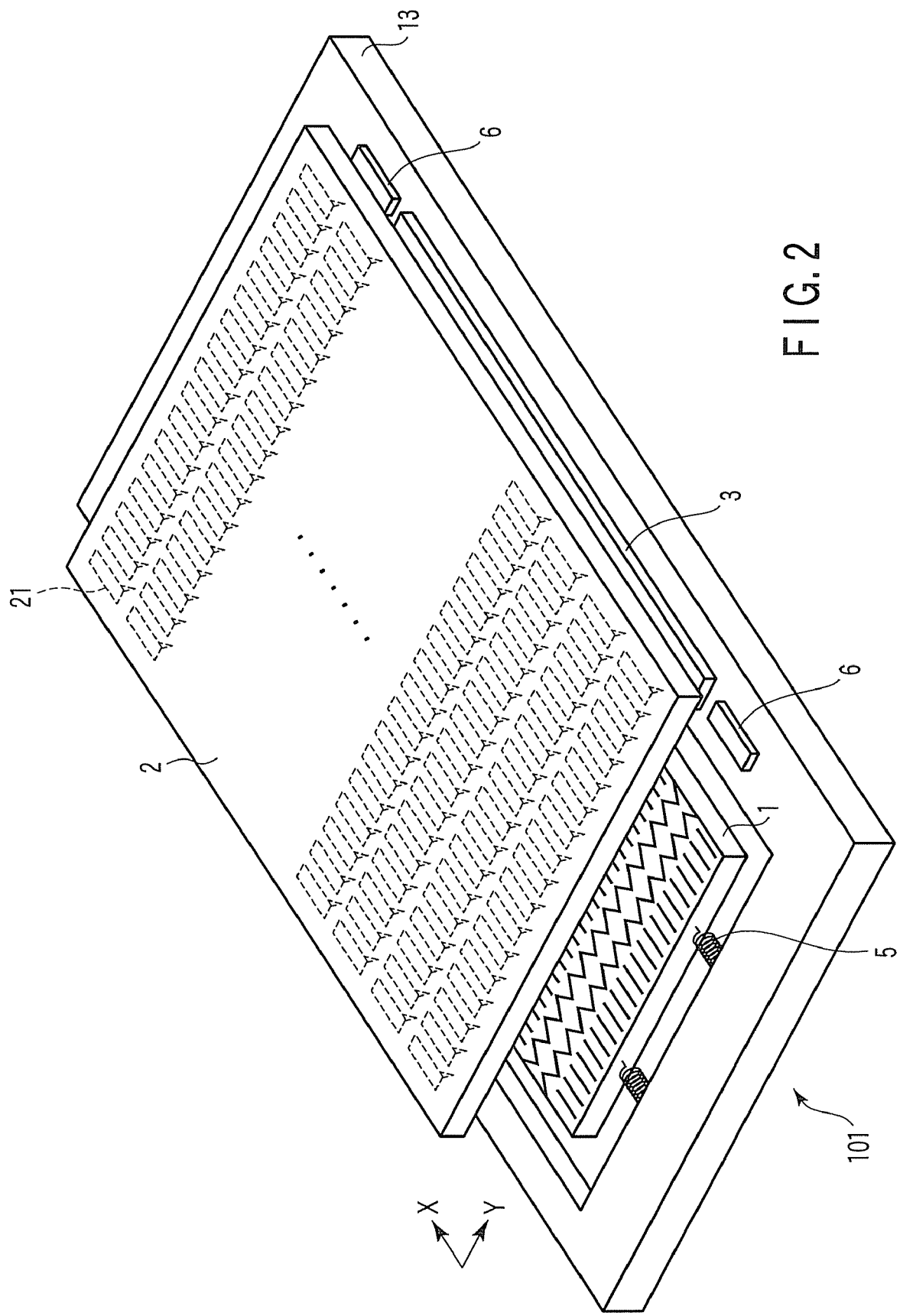
FIG. 2 is a view showing a conceptual configuration example of a stage side including a probe array and a recording medium.

FIG. 1 is a view showing a schematic configuration example of a probe memory device on which a positioning system is mounted, according to a first embodiment of the present invention. FIG. 2 is a view showing a conceptual configuration example of a stage side including a probe array and a recording medium. In the following description and drawings, in directions orthogonal to each other along edges in two opposite edges of a square shaped recording area, one direction is defined as an X direction or a data direction (data recording direction), and the other direction is defined as a Y direction or a track direction.

A probe memory device of the present embodiment roughly includes: a recording medium 1 serving as a recording and reproducing section for recording information; a probe array (probe head section) 2 for writing and reading out the information; a movement mechanism 100 for carrying out movement, position detection, and position control of the recording medium 1; an information processing section 200 in which probes 21 are selected and driven by means of a probe array mechanism 201, the information processing section carrying out processes for writing and reading out information relative to these probes 21; and an input and output section 12 provided with an interface function.

In the probe memory device according to the present embodiment, at the time of writing or reading out information, a specific frequency (for example, a ultrasound-area frequency) is applied to the recording medium 1 and the probe head section 2, and then, a reciprocating motion (for example, scanning movement in the data direction) is carried out in one axis direction by means of vibration thereof. Therefore, the term "positioning" in the present embodiment is to move a probe head section to a position where a plurality of probes disposed in a row are moved for scanning on a track on which data is recorded, without deviating from the track, relative to the Y direction (track direction) orthogonal to the data direction. At the time of the movement, feedback control is carried out for acquiring relative position information between the recording medium 1 and the probe head section 2, based on information acquired from a servo area, processing the relative position information at a control section, and carrying out position correction with respect to an actuator 3. By means of this ultrasound, the recording medium 1 is driven in a vibrated manner (are reciprocatingly moved), and at least one probe 21 of the probe head section 2 is relative to a servo area so that information can be read.

Therefore, the present embodiment explained below describes positioning and movement relative to the Y direction instead of two-axis movement in the XY direction, and the movement in the X direction suggests movement for correcting a scanning range of a probe when the gradient in the Y direction is adjusted.

In this probe memory device, a stage 101 at which the recording medium 1 is provided is configured to carry out coarse movement and fine movement in the XY direction, and the probe head section 2 at which a number of probes are provided is configured to move in the Z direction in opposite to the stage 101. Of course, because the stage 101 and the probe head section 2 may be relatively movable, the movements reversed from those in this configuration may be made, or alternatively, one of them may be fixed and the other may be moved in a three-dimensional direction (XYZ direction). In addition, while the movement in the Z direction, i.e., distance adjustment between the probe 21 and a recording area is made with the use of equipment such as an electrostatic actuator and an electrostatic driver section, the present embodiment is directed to a technique relating to the movement in the Y direction. A detailed description of the movement in the Z direction is omitted here.

In the probe memory device shown in FIG. 2, the square shaped recording medium 1 is supported swingably (movably) in the track direction (Y direction) by means of a guide mechanism 5 provided at a frame member 13 of the stage 101. The guide mechanism 5 is formed in a shape having elasticity or is formed of an elastic member. A guide mechanism for swingably supporting the medium in the data direction (X direction) may be provided whenever necessary.

Figure 3:
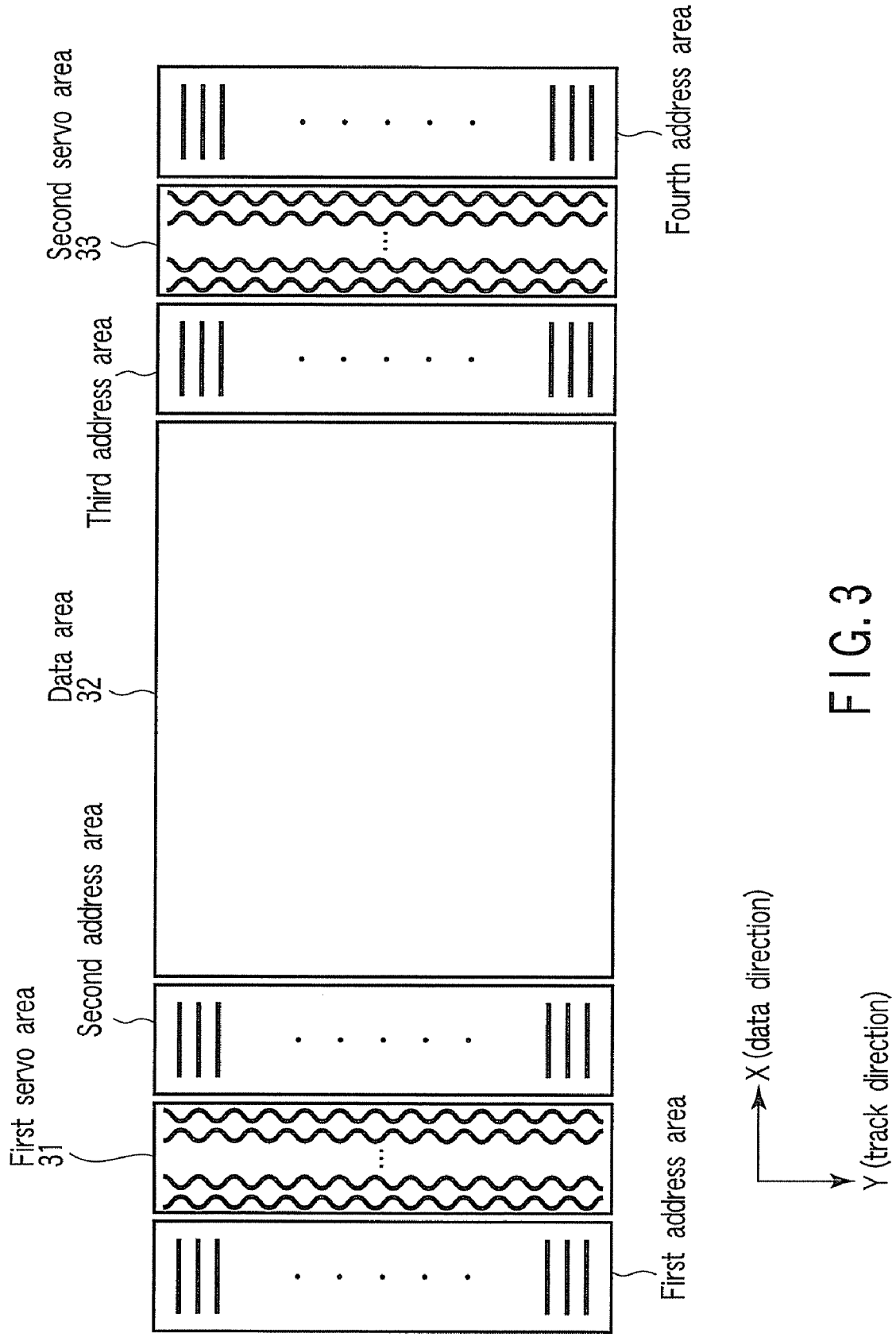
FIG. 3 is a view showing a positional relationship between a data area and a servo area in the recording medium.

In the recording medium 1, as shown in FIG. 3, a first servo area 31 and a second servo area 32 in which servo patterns (feedback information) described later for carrying out position detection are formed, are disposed at both sides, respectively (for example, both ends in the X direction) around a data area 32.

In these first and second servo areas 31 and 33, while servo patterns A and B of two columns shown in FIG. 4C described later are formed in one group, 10 groups are arranged and disposed, for example, as shown in FIG. 2, whereby 10 position detections are repeatedly and continuously carried out. A precise detection result can be obtained while a detection mistake or an error is eliminated from an average value of the detections.

In addition, first and second address areas are provided at both sides of the first servo area 31, and third and fourth address areas are provided at both sides of the second servo area 33, respectively. In the present embodiment, these address areas are allocated at both sides of the data area so that a seek operation can be made while the probe head section is moved from any data direction (left to right or right to left on the paper in FIG. 3). Of course, there is no need for always allocating the address areas at both sides of the data area, and similar effect can be attained even if they are disposed on at least one side.

A description of the movement mechanism 100 will be given.

As shown in FIGS. 1 and 2, the movement mechanism 100 includes: the guide mechanism 5 for elastically supporting the recording medium 1 on the frame member 13 of a stage; an actuator 3 described later; a driver section 6 for driving the actuator 3; a position sensor 4; a measuring circuit 8 for carrying out distance measurement by means of the position sensor 4; and a control section 9 for carrying out feedback control with the use of the measurement values from the measuring circuit 8.

A pair of multilayer type piezoelectric actuators (hereinafter, referred to as actuators) 3 are disposed respectively at a substantial center at both edges in the Y direction of the frame member 13 to which the recording medium 1 is securely fixed. Further, two pairs of position sensors 4 for detecting a position change in the Y direction are disposed at a position proximal to each of the first servo area 31 and the second servo area 33 at both sides (X direction) of the actuator 3.

As the position sensor 4, for example, a sensor of non-contact type is preferred for optically detecting a position with the use of infrared-rays or the like. These position sensors 4 detect whether or not the amplitude of the recording medium is equal to or greater than a predetermined width.

The probe head section 2 has an opposite area that is substantially equal to that of the recording medium 1 or that covers the actuator 3. Probes 21 arrayed in the shape of plural, for example, 1,024×1,024 matrixes are provided at the opposite face side thereof. These probes 21 are separately provided for use in recording and reproduction relative to the recording medium 1 and for use in positioning servo. In the present embodiment, the probes 21 for use in recording and reproduction are connected to a signal processing section via a switch 11 in which a switching operation for probe selection is controlled by means of the control section 7. The probes 21 for use in positioning servo are connected to a direct signal processing circuit 10. The recording medium 1 and the probe head section 2 are moved relatively to each other. For example, the recording medium 1 is moved into a plane with the degree of freedom X-Y2 with the use of the actuator 3. Of course, these elements may be disposed in opposite to each other. In other words, a stator is provided while the recording medium 1 is placed at the storage side, and the actuator is provided at the side of the probe head section 2, whereby the degree of freedom X-Y2 may be moved.

Next, a servo area and a servo pattern in the recording medium 1, according to the present embodiment, will be described with reference to FIGS. 4A to 4D.

Figures 4A, 4B, 4C:
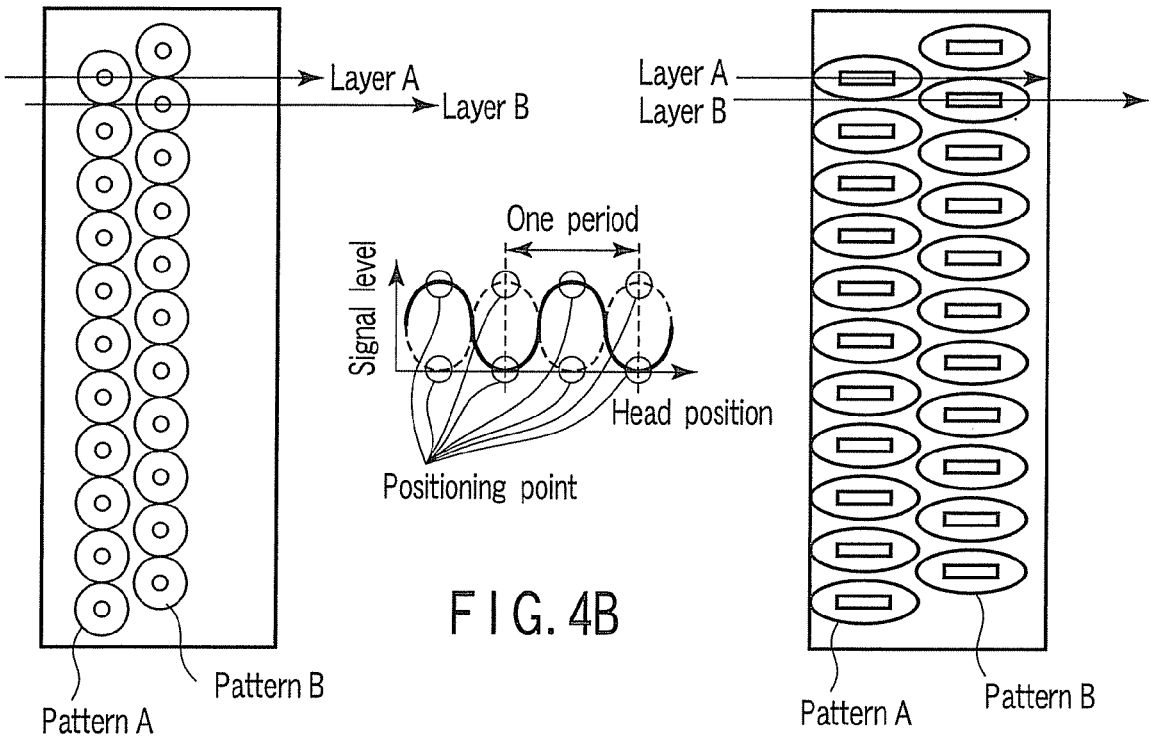
FIGS. 4A, 4B, 4C, and 4D are views for explaining a servo area and a servo pattern in the recording medium according to the present embodiment.

FIGS. 4A and 4C each show an example of a servo pattern in the present embodiment; FIG. 4B shows a signal level of a detection signal of a servo pattern inputted to the signal processing circuit 10; and FIG. 4D shows a schematic layout example of a probe relative to the servo areas 31 and 33 (first and second servo areas) and the data area 32.

Figure 4D:
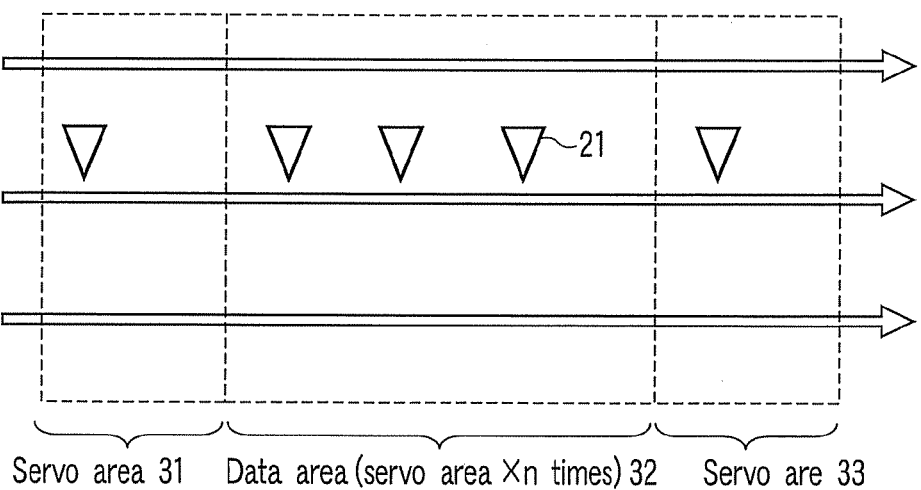

In the present embodiment, as shown in FIG. 4D, the data area 32 has an area (length) that is n times of that of each of the servo areas 31 and 33. In this data area 32, n pieces of recording and reproducing probes 21 are arranged. At least one dedicated probe 21 is arranged per one servo area in order to detect a servo pattern in each of the servo areas 31 and 33.

Therefore, the data area is divided into regions having an area (length) equal to that of the servo area, and each probe 21 is operated to access the corresponding area. In each area for which one probe 21 is responsible, several hundreds to several thousands of recording dots are formed in response to the size of a recording dot. On the other hand, with respect to a servo pattern formed in the servo area, servo information cannot be provided in size of the recording dot, and thus, one protrusive servo pattern is responsible for a row included of several tens to several hundreds of recording dots.

In the present embodiment, as shown in FIG. 4A, servo patterns A and B of two columns are arranged toward a track direction (Y direction). The double circles shown in the figure indicate the shape of one pattern viewed from above, and the shape viewed in the horizontal direction is a trapezoidal shape in which an inside small circle is defined as a top part or a hemisphere-shaped protrusion. The servo patterns A and B are also provided at the opposite sides while the data area is sandwiched between the patterns, as shown in FIG. 3. The servo pattern A is formed while it is phase-shifted from the servo pattern B by 180 degrees.

Therefore, as shown in FIG. 4B, with respect to a signal level to be inputted to the signal processing circuit 10, a difference in absolute value between a reproduction signal A and a reproduction signal B is obtained as "0". The positioning points at this time are the maximum and minimum values of the signal level, i.e., the highest position and the lowest position in movement in the Z-axis direction of a probe tip end. In the present embodiment, the servo pattern assumes an order of 20 nm as one protrusion (one period for a reproduction signal). Of course, this length is not limited to 20 nm, and is obtained as the size that conforms to the data size (row).

In addition, in FIG. 4A, even in the case where layers A and B illustrated so as to be parallel to each other have moved in a track direction (Y direction shown in FIG. 3) in a state in which they are slightly inclined obliquely, a slight phase shift occurs at a positioning point of the signal level shown in FIG. 4B. However, it may be difficult to judge whether the phase shift is present or absent.

Therefore, as shown in FIG. 4C, the top part of the protrusion of each servo pattern is formed to be long in an X direction (data direction), for example, to be rectangular. Therefore, one pattern is formed in an elliptical shape when it is viewed from above, and is a long trapezoidal shape that is two times or more longer in the X direction than in the Y direction or a boiled-fish paste shape rounded at both ends when it is viewed in the horizontal direction (or the shape in which a trapezoidal inclined portion is curved).

This is because a dot shaped servo pattern as shown in FIG. 4A is repeatedly formed. At this time, the signal level intensity information is maintained at a constant value with respect to the direction in which the probe vibrates (moves reciprocatingly) (for example, X direction).

In addition, with respect to the direction orthogonal to the vibration (Y direction), it is desirable that a signal value change linearly in response to a distance (a displacement from a location to be positioned). Actually, as long as the protrusive shape of a servo pattern is formed in a dot shape (circular shape when viewed from above), a change of a signal value occurs with respect to vibration (reciprocating movement) of a probe head. Therefore, as shown in FIG. 4C, the servo pattern quantity (or pattern length) at the vibration (reciprocating movement) side in the X direction is defined to have a length that is at least two times or more in integer multiple with respect to the servo pattern quantity (or pattern length) in the Y direction. As a result, erroneous recognition of a signal can be prevented.

FIG. 5 describes a positioning system using a servo pattern. This positioning system includes: a probe 21 for detecting a protrusion of a servo pattern; a servo pattern read processing circuit 22 included in a processing circuit 10; a control section 7 for outputting a feedback position correction signal in accordance with a positioning result from the processing circuit 10; a driver section 6 for driving and controlling an actuator 3 by means of the correction signal; and the actuator 3. These constituent elements are the same as some of the constituent elements shown in FIG. 1 described previously.

The read processing circuit 22 includes: a sampling section 23 for inputting a reproduction signal of a signal level shown in FIG. 4B detected by the probe 21; a data Va processing section 24 for inputting a reproduction signal Va by means of the servo pattern A, and then, distributing and outputting the inputted signal to a circuit at a succeeding stage; a data Vb processing section 25 for inputting a reproduction signal Vb by means of the servo pattern B, and then, distributing and outputting the inputted signal to a circuit at a succeeding stage; an adder circuit 26 for adding the reproduction signal Va and the reproduction signal Vb (as an additive value); a subtractor circuit 27 for obtaining a difference (subtractive value) between the reproduction signal Va and the reproduction signal Vb; and a divider circuit 28 for dividing a subtractive value by an additive value. Although the read processing circuit 22 is described while it is sampled as another element in FIG. 5, this circuit is generally included in the control section 7.

Specific examples will be described below.

1) The reproduction signal Va from the servo pattern A and the reproduction signal Vb from the servo pattern B are generated. However, the reproduction signal is 1 Vmin to Vmax in amplitude, and Vmin<Va and Vb<Vmax. The servo pattern A and the servo pattern B are shifted in phase by 180 degrees. In other words, as shown in FIG. 4B, when the reproduction signal Va is at Vmin, the reproduction signal Vb is at Vmax.

2) Div=(Va−Vb)/(Va+Vb) is calculated by means of reproduction signal processing. If the probe 21 exists at a position of the layer A as shown in FIG. 4C, and the position of the probe coincides with that of a track, Div=0 is established.

3) In the case where the probe head section 2 is tilted relative to the recording medium, Div>0 is established, and there is a need for correcting the row tilt of the probe 21 so as to be adjusted to a lower track number. In the case where Div<0, it is corrected in an opposite direction.

4) In a state in which information is not recorded, servo information can be obtained, and no information is contained in the data area. A servo signal is read by means of the probe 21, and recording information is written while the position of Div=0 is defined as a correct track position.

In a conventional technique, as a probe movement quantity increases and positioning precision becomes fine with downsizing of recording medium and an increase in recording area, the influence of mechanical properties (rigidity and resonance point) of a probe section becomes important. For example, in the current HDD of 2.5 inches to 0.85 inch, the mechanical control bandwidth of the probe section is about 1 kHz, and it is not easy to remarkably improve this bandwidth from the standpoints of mechanical size and the material characteristics of the probe section. On the other hand, in order to improve a transfer rate and achieve specific performance (200 Mbps or more), there is a need for vibrating the probe head section 2 at a specific speed/frequency or more with respect to the recording medium 1 (scanning operation in X direction).

It is desirable to acquire (sample) information for applying feedback at least at 2 times or more of advantageous effect or about 10 times if possible at the time of specific calculation, based on servo information. Therefore, in the servo area, a series of servo patterns are disposed to appear a plurality of times along the direction of probe scanning movement.

Figure 6:
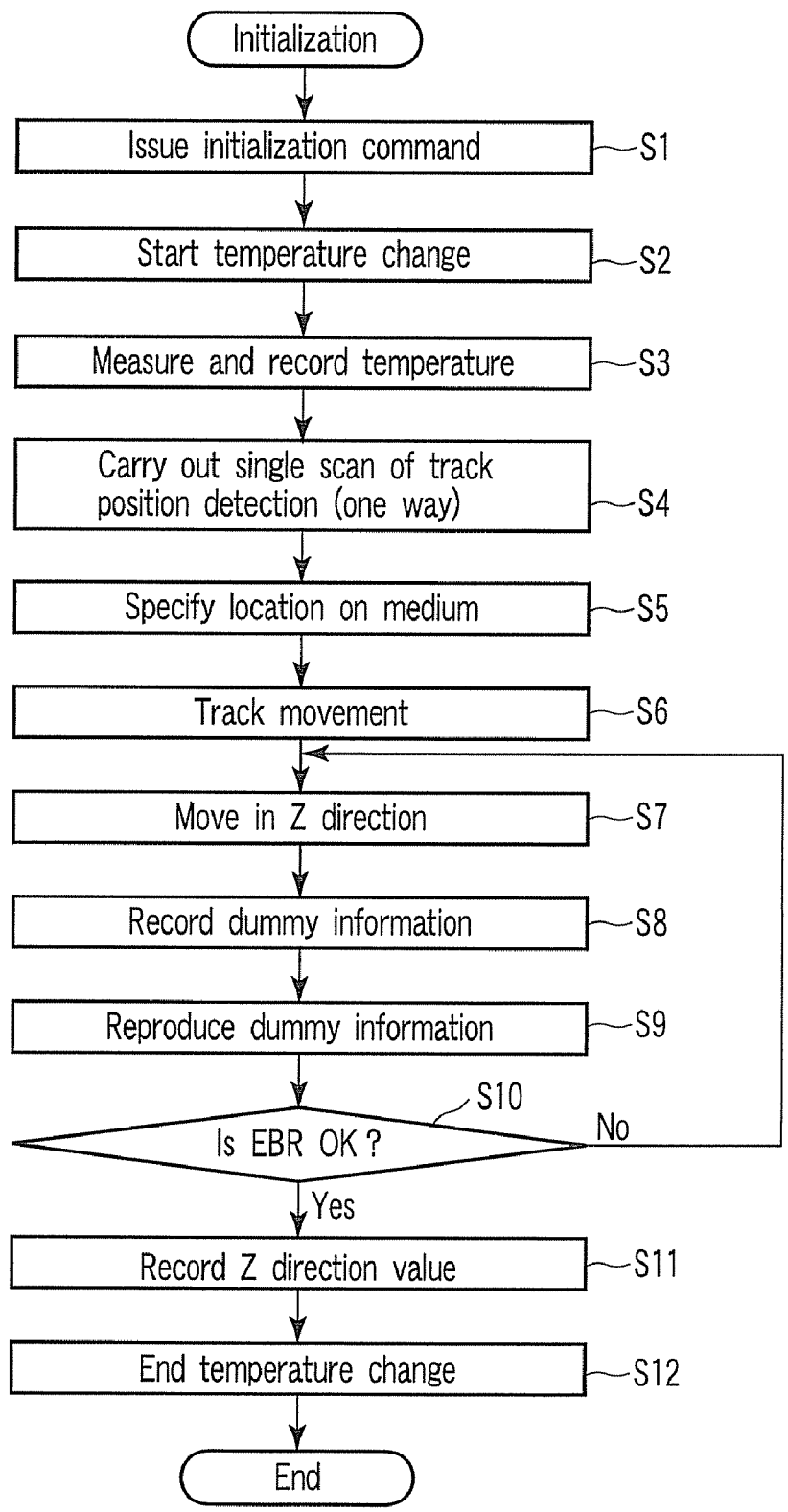
FIG. 6 is a flow chart for explaining the term "initialization" in the probe memory device according to the first embodiment.

Next, the term "initialization" in a probe memory device will be described with reference to the flow chart shown in FIG. 6.

First, an initialization command is supplied from a user to the control section 7 (step S1). The control section 7 starts power supply to the respective constituent elements, and then, changes a temperature of the probe head section 2 (step S2). At this time, a temperature is measured and recorded after elapse of a predetermined time or at each predetermined period, with the use of a temperature sensor (not shown) (step S3).

Next, the predetermined probe 21 at the probe head section 2 carries out one scanning movement (scan) in order to detect a current track position (step S4), and then, recognizes the current track position. Depending on settings or the like, based on this scanning result, control may be carried out so as to move to a track position specified as an initial position.

Next, a location (track) on the medium 1 is specified for carrying out trial writing as adjustment (step S5), and then, the probe 21 is moved to the specified track (step S6).

Next, movement in the Z direction is made until a proper distance between the probe 21 and a recording face is obtained (step S7).

Next, dummy information is recorded as trial writing relative to a track serving as a recording target (step S8), and then, the dummy information is reproduced (step S9). It is judged whether EBR (Error Bit Rate) is correct or not with respect to a result of the reproduction (reproduction signal) (step S10). In the case where the EBR does not reach a desired level at the time of judgment (NO), the current step reverts to step S7 in which movement in the Z direction is made again; a distance between the probe 21 and the recording face is adjusted, and then, dummy information is recorded and reproduced. On the other hand, in the case where the EBR has reached a desired level (YES), the Z direction value (distance between probe 21 and recording face) is recorded in a memory (not shown) of the control section 7 (step S11), a temperature change is terminated (step S12), and then, the initialization sequence is terminated.

Figure 7:
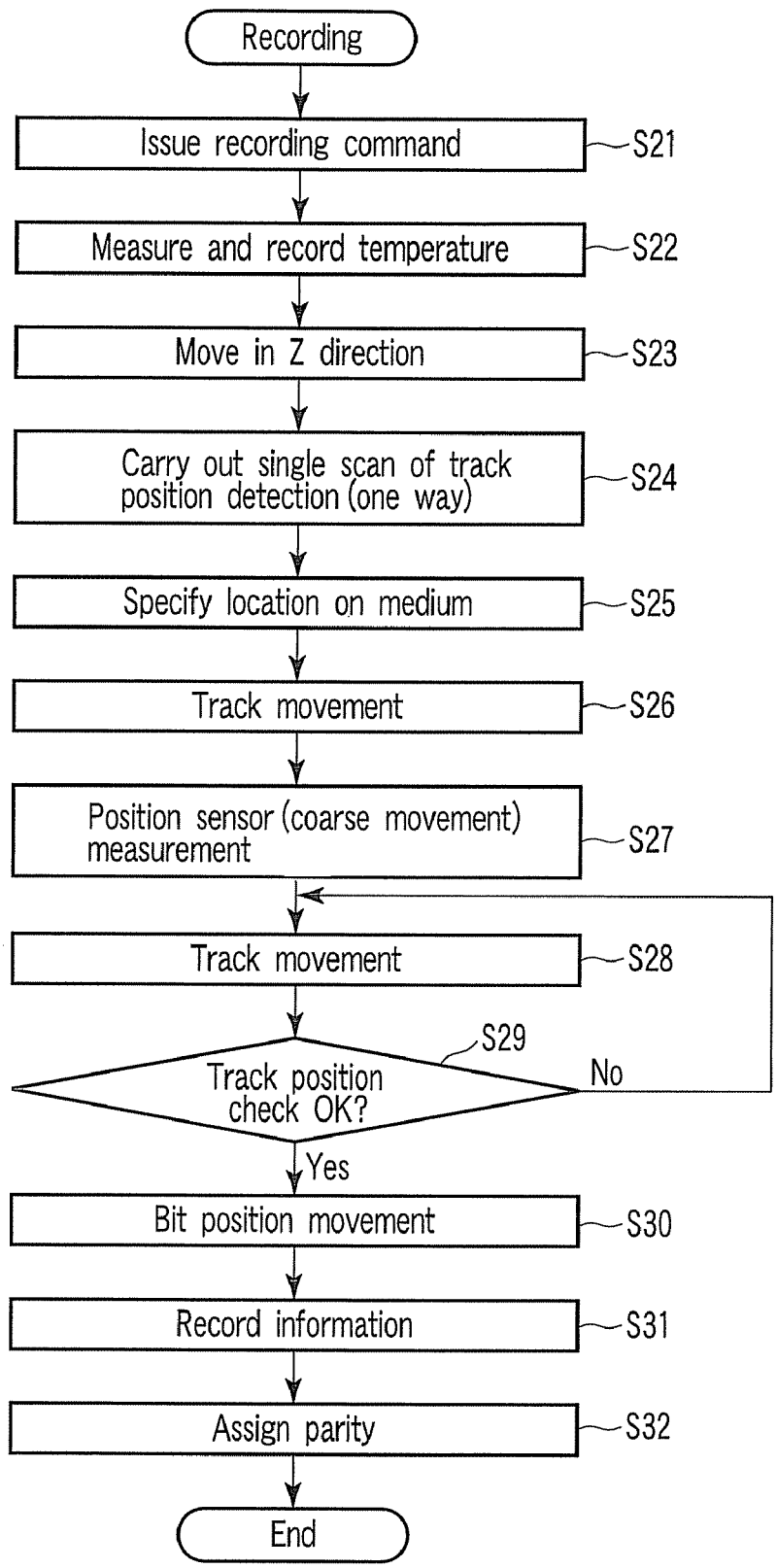
FIG. 7 is a flow chart for explaining the term "recording" in the probe memory device according to the first embodiment.

Next, the term "recording" processing in a probe memory device will be described with reference to the flow chart shown in FIG. 7.

The control section 7 transmits to the respective constituent elements a command for starting a recording operation by means of a user's instruction (step S21). First, a temperature of the probe head section 2 is measured and recorded (step S22). After that, movement in the Z direction is made for the measured temperature with reference to the Z direction value recorded at the time of initial setting (step S23). After the end of the movement, one scanning movement (scan) is made in order to detect a current track position (step S24), and then, the current track position is recognized.

Next, the control section 7 specifies a recording location (such as track number) on the medium 1 in response to information to be recorded by a user (step S25); and then, starts track movement (movement in Y direction) (step S26). At this time, the progress of coarse movement of the recording medium 1 relative to the stage 101 is measured by means of the position sensor 4 (step S27).

Further, track movement is made (step S28), and then, position check is made as to whether or not a specified track has been reached (step S29). In the case where the specified track has not been reached yet by this position check (NO), the current step reverts to step S28 in which movement is continued. On the other hand, if the specified track has been reached (YES), the movement is stopped, and then, the medium moves to a specified bit position (step S30). After that, information is recorded in the specified bit (step S31), a parity is further assigned (step S32), and then, a series of recording operations is terminated.

Figure 8:
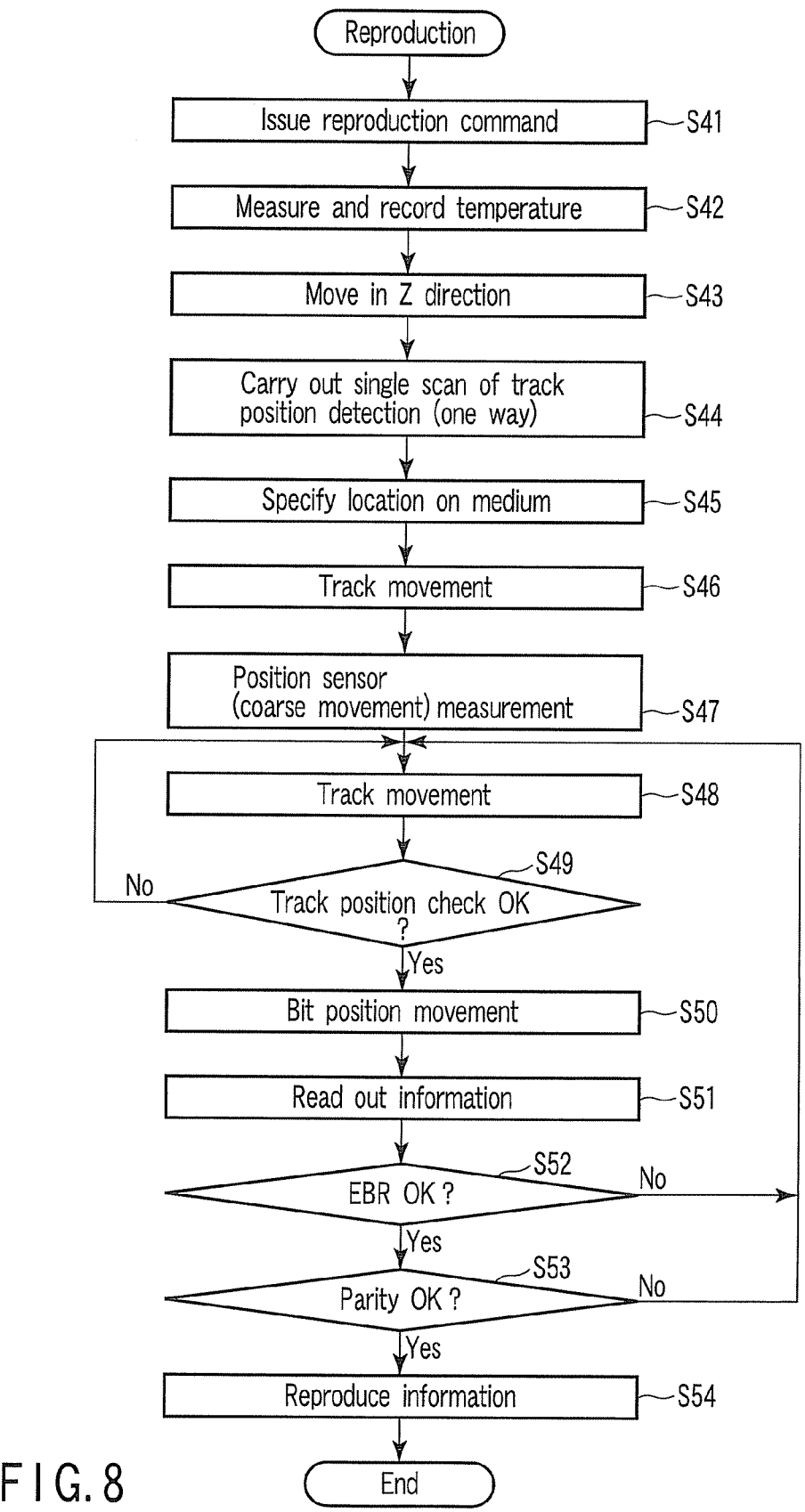
FIG. 8 is a flow chart for explaining the term "reproduction" in the probe memory device according to the first embodiment.

Next, the term "reproduction" processing in a probe memory device will be described with reference to the flow chart shown in FIG. 8.

The control section 7 transmits to the respective constituent elements a command for starting a reproducing operation by means of a user's instruction (step S41). First, a temperature of the probe head section 2 is measured and recorded (step S42). After that, movement in the Z direction is made for the measured temperature with reference to the Z direction value recorded at the time of initial setting (step S43). After the end of the movement, one scanning movement (scan) is made in order to detect a current track position (step S44), and then, the current track position is recognized. Next, the control section 7 specifies a recording location (such as track number) on the medium 1 on which information to be reproduced by a user is recorded (step S45); and then, starts track movement (movement in Y direction) (step S46).

At this time, the progress of coarse movement of the recording medium 1 relative to the stage 101 is measured by means of the position sensor 4 (step S47). Further, track movement is made (step S48), and then, position check is made as to whether or not a specified track has been reached (step S49). In the case where the specified track has not been reached yet by this position check (NO), the current step reverts to step S48 in which movement is continued. On the other hand, if the specified track has been reached (YES), the movement is stopped, and then, the medium moves to a specified bit position (step S50).

Then, the specified information is read out (step S51). It is judged whether or not the EBR is proper with respect to the read out information (step S52). If the information read out by this judgment is not proper (NO), the current step reverts to step S48 in which a bit position is reset. On the other hand, if the read out information is proper with respect to the EBR (YES), the next assigned parity is checked (step S53). If this parity is not specified (NO), the current step reverts to step S48 in which a track is moved again, and then, a position check is made. On the other hand, if the parity is specified (YES), it is judged to be desired information, and the information is processed by means of the signal processing section 10. Then, the processed information is outputted to an external device, for example, a computing device such as CPU, and then, a series of reproducing sequences is terminated.

Figure 9:
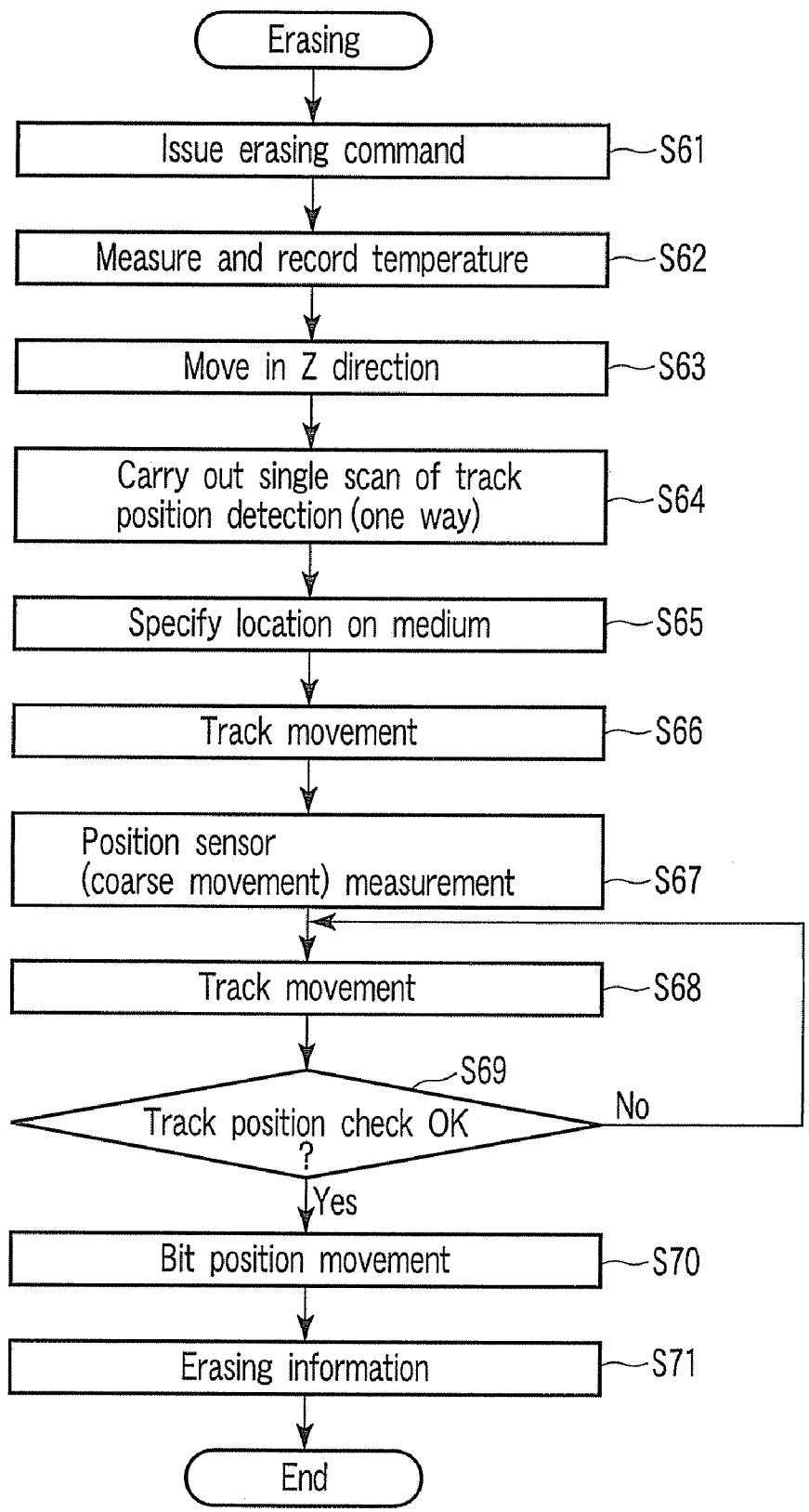
FIG. 9 is a flow chart for explaining the term "erasing" in the probe memory device according to the first embodiment.

Next, the term "erasing" processing in a probe memory device will be described with reference to the flow chart shown in FIG. 9.

The control section 7 transmits to the respective constituent elements a command for starting an erasing operation by means of a user's instruction (step S61). First, a temperature of the probe head section 2 is measured and recorded (step S62). After that, movement in the Z direction is made for the measured temperature with reference to the Z direction value recorded at the time of initial setting (step S63). After the end of the movement, one scanning movement (scan) is made in order to detect a current track position (step S64), and then, the current track position is recognized.

Next, the control section 7 specifies a recording location (such as track number) on the medium 1 on which information to be erased by a user is recorded (step S65); and then, starts track movement (movement in Y direction) (step S66). At this time, the progress of coarse movement of the recording medium 1 relative to the stage 101 is measured by means of the position sensor 4 (step S67).

Further, track movement is made (step S68), and then, position check is made as to whether or not a specified track has been reached (step S69). In the case where the specified track has not been reached yet by this position check (NO), the current step reverts to step S68 in which movement is continued. On the other hand, if the specified track has been reached (YES), the movement is stopped, and then, the medium moves to a specified bit position (step S70). After that, information is erased from the specified bit (step S71), and then, a series of erasing operations is terminated.

In the probe memory device constructed as described above, in order to carry out positioning with the use of a servo pattern provided in a servo area on the recording medium 1, the recording medium 1 and the probe head section 2 are reciprocatingly moved (scan-moved) by means of vibration of a specific frequency in a single axis direction. At this time, based on information from the servo area, information on a relative position between the recording medium 1 and the probe head section 2 is acquired, the relative position information is processed at the control section, and feedback control is carried out to perform position correction relative to the actuator 3.

While the probe memory device according to the present embodiment is in a research and development phase, this device can become a "breakthrough" technique of greatly improving a recording density limit in comparison with a conventional storage mechanism.

Next, a second embodiment will be described.

Figure 10:
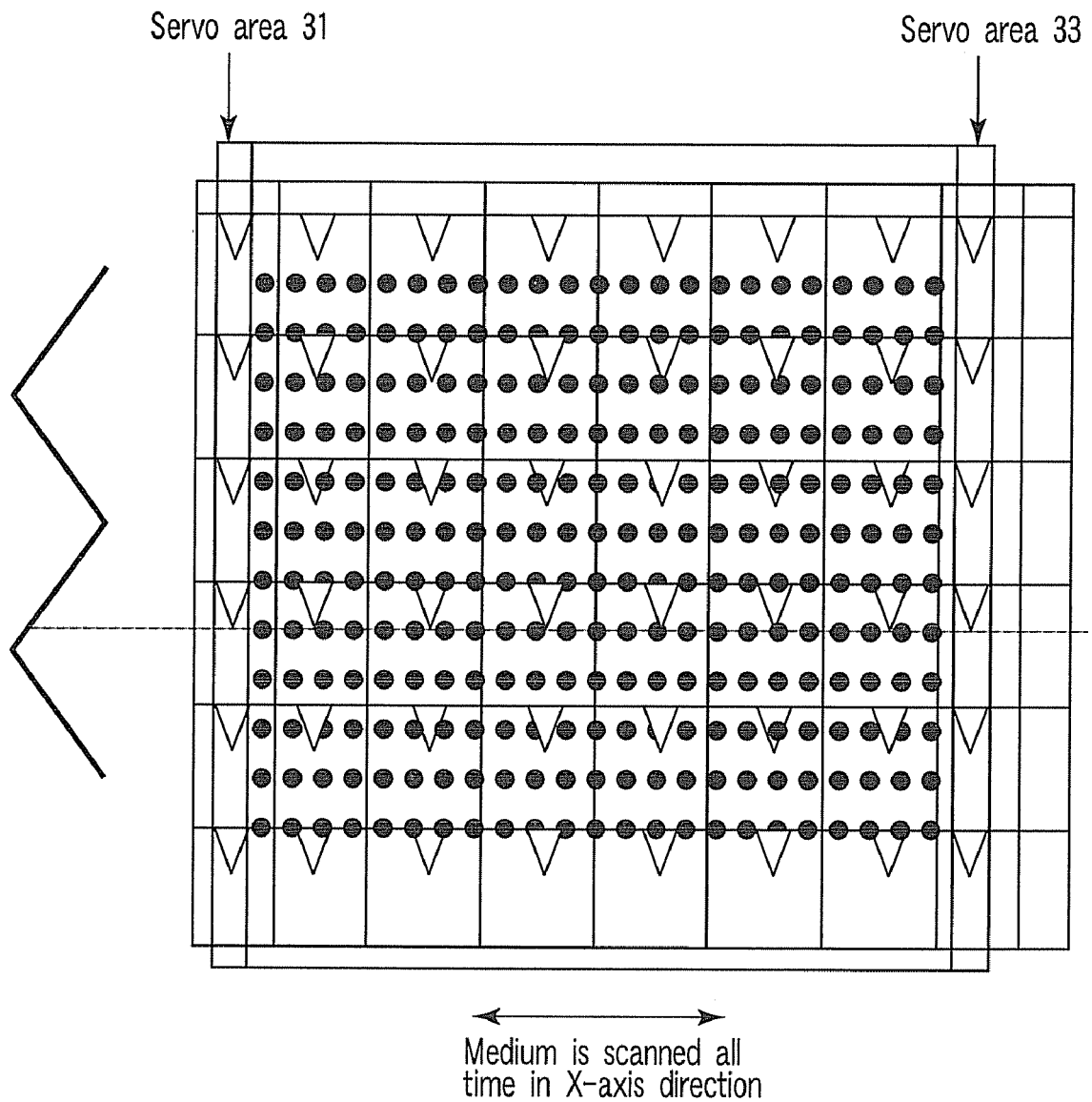
FIG. 10 is a view showing a servo pattern of a recording medium according to a second embodiment.
Figure 11A:
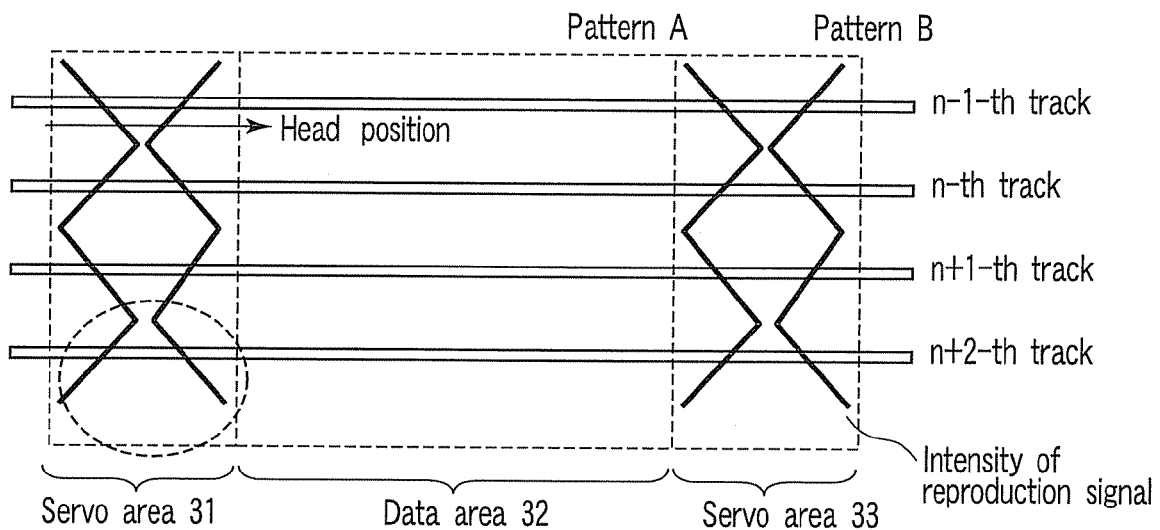
FIGS. 11A and 11B are views showing an example of a servo pattern formed in a servo area of the recording medium according to the second embodiment.
Figure 11B:
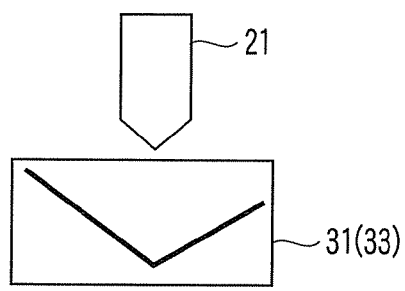
Figure 12:
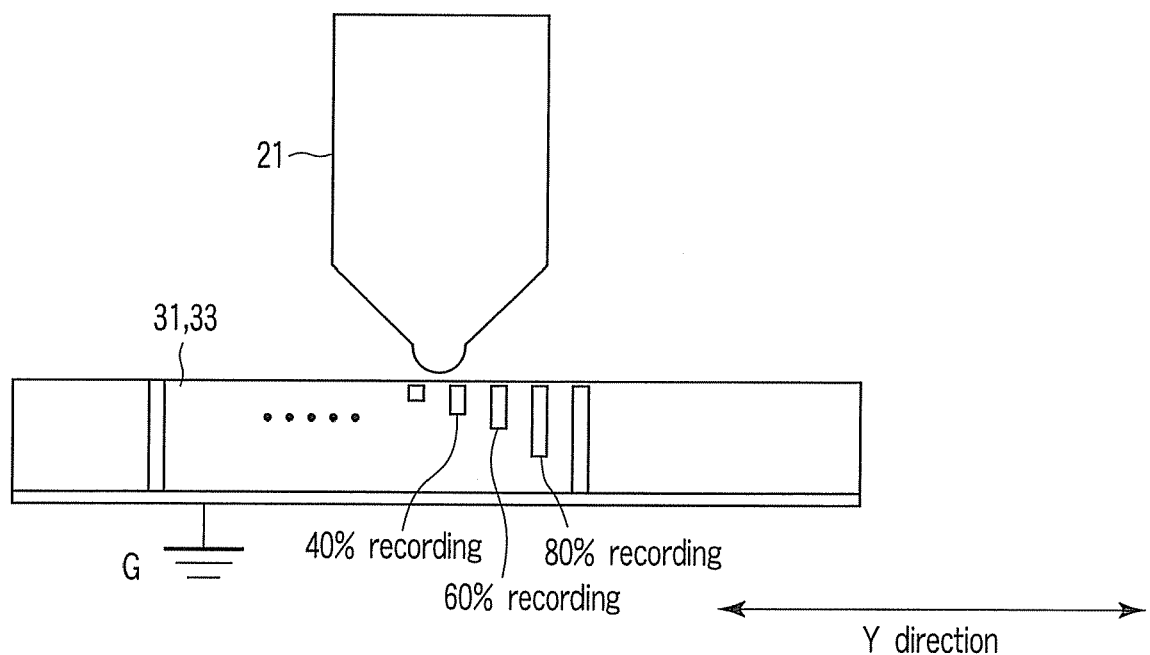
FIG. 12 is a view for explaining a servo pattern by means of multi-value recording formed in a servo area of the recording medium according to the second embodiment.

The foregoing embodiment has described servo patterns of two columns while shifting a phase of patterns caused by a plurality of continuous protrusions. Such servo patterns has utilized a reproduction signal having a sine wave-like change. An ideal reproduction signal from the servo pattern is desired to be a triangular wave, as shown in FIG. 10. Specifically, with respect to the triangular wave, as shown in FIG. 11A, for example, patterns A and B are provided in a servo area 31 and a servo area 33 such that two triangular waves having a phase shift of 180 degrees can be obtained. These patterns A and B are intended to make multi-value recording in a mountain-like shape with respect to the servo areas, as shown in FIG. 12. FIG. 11B shows a valley portion of a triangular wave of a portion surrounded by the dotted line of FIG. 11A.

Now, attention has been paid to a multi-value recording memory device having a novel principle of recording called RRAM(resistance RAM). This is because it is almost proved that this memory device is superior in performance such as power consumption, recording density, switching speed, and ON/OFF rate, although it can be comparatively easily produced. Although it is not verified in all of the RRAM, in NiO and PrCaMnO as well as $ZnMn_2O_4$, an intermediate value other than "1" and "0" can be recorded. A description will be given with respect to a case of using these media for a configuration of a servo pattern as well as a recording section.

A write reproduction probe is sharpened at its tip end, for example, and an electron generation source or a hot electron source is connected to the probe. This recording medium has a laminated structure in which an undercoat electrode layer, a recording layer, and a surface protection layer are formed on a substrate.

Among them, the undercoat electrode layer is grounded. In the case of writing into the recording medium, as shown in FIG. 12, a pulse current is applied from the probe 21 to a recording face, thereby phase-changing a material of a recording section (recording layer). In this manner, this writing is carried out so that a phase change becomes zigzag shape in the depth direction (so that a pattern vertically bent at an acute angle is formed).

In addition, in the case of carrying out readout, a minute amount of current is applied to such an extent that the phase change of material of the recording medium does not occur, and then, information is read out by reading a resistance component thereof. In FIGS. 10 and 11A, while a triangular wave is conveniently described such that deep and shallow portions are transversely assigned in the depth direction, a material is actually phase-changed so that a zigzag pattern is formed in the depth direction, as shown in FIG. 12, and then, a sampled reproduction signal is produced as a triangular wave such that the magnitude of a signal level is bent at an acute angle.

Next, a method for manufacturing the recording medium according to the second embodiment will be described.

A Si-substrate is used as a base substrate. On this Si-substrate, a Ti film and a Pt film serving as an undercoat electrode layer are sequentially laminated, and then, the laminate is evaporated and formed so as to have the film thickness of about 50 nm. On the undercoat electrode layer, a NiO film with film thickness of 20 nm is formed with the use of RF magnetron sputtering. The process condition was as follows. Namely, a film was formed with the use of a target in which constitution was adjusted to obtain a recording layer NiO under an atmosphere of Ar: 95% and O: 0:25% in the range of a substrate temperature of 300° C. to 600° C.

Further, a pulse wave with a different voltage is applied to a portion serving as a servo area of the recording medium with the use of a voltage applying device having a sharp tip end such as a probe of an atomic force microscope (AFM) and a stage that is capable of position control with high precision. In this manner, a predetermined resistance value as shown in FIG. 12 is recorded.

An ideal servo pattern is obtained as a triangular pattern such that one period is formed every 10 rows (data rows) to 20 rows in the y direction, as schematically depicted in FIG. 10. It is possible to grasp how much shift occurs by a readout signal from a servo pattern when vibration is carried out at a predetermined period in the X direction.

At this time, if a servo pattern per se is significantly changed in resistance in a very small range, it becomes difficult to specify a position. Thus, this is not suitable for the servo pattern. It is difficult to utilize a recording medium used in PRAM such as NiO as it is for a servo pattern, because a filament (thin wire)-like conductive path is formed.

Therefore, in order to form a triangular wave in the y direction, with the use of an intermediate value of the principle of PRAM recording, as shown in FIG. 12, a servo pattern is formed while a resistance value is changed like gradation so as to record a 10% resistance value ("0.1") just adjacent to a recording bit of the highest resistance ("0") and a 20% resistance value ("0.2") further adjacent thereto.

Here, in order to make such recording, a probe equal to or thinner than a probe of a recording portion is provided, and this recording is made with the use of a manufacturing apparatus having a stage with high position controllability. At the time of forming a triangular wave in the Y direction, although such a triangular wave may be written in sequential order from an end, if a portion of the lowest resistance ("1") is written once, current concentration occurs with its proximity, thus making it difficult to form a predetermined resistance at a predetermined position.

Therefore, portions of low resistance are recorded in sequential order from that of a high resistance. In a recording medium used for PRAM such as NiO, it is difficult to a form filament (thin wire)-like conductive path, and then, record another resistance value in seamlessly adjacent areas.

However, if a structure is provided such that a servo probe is thicker than a recording and reproducing probe, and comes across the adjacent servo recording dots, a reproduction signal can be produced so that an electrical resistance sensed by means of a probe of a servo section is smoothly continuous in the Y direction. It is further preferable to form such a mountain shaped change in recording pitches equal to those of the recording section at which a recording density has been increased to its maximum. In addition, there are two methods, i.e., a method for changing a voltage and a method for changing a pulse width of a current with respect to identifying a high resistance and a low resistance. On the other hand, it is preferable that a pattern with a rapid change is formed in the X direction.

According to the present embodiment, a gentle change and a rapid change of a servo pattern can be arbitrarily selected. While the first embodiment has described a method of forming a servo pattern on the recording medium, and then, combining the medium with a probe head section later, it may be thought to use a method of combining a medium and a probe head section with each other, and then, self forming a servo pattern with the use of a servo probe.

As has been described above, the present embodiment is suitable for use in a recording medium for recording information with higher density by making multi-value recording gradually changing with a mountain shape, and then, generating a servo pattern reproduction signal with a triangular wave.

Now, driving (reciprocating movement) or the like of the recording medium in the probe memory device of the foregoing embodiments will be conceptually described.

A probe memory device is formed with the use of a semiconductor manufacturing technique, MEMS (Micro Electro Mechanical System) technique or the like. The probe head section 2 and the recording medium 1 disposed in opposite to each other are driven by means of an expanding and contracting operation and a pressing operation using a piezoelectric actuator and an electrostatic actuator. Either or both of the probe head section 2 and the recording medium 1 may be driven. The present embodiment gives a description by way of a configuration example in which the recording medium 1 carries out driving (reciprocating motion and seek operation).

These actuators are provided at a frame section that surrounds the recording medium 1. The recording medium 1 is suspended by means of a guide mechanism (or elastic member) having elasticity inside the frame section. The actuators are composed of a piezoelectric element and an electrode, for example. In the present embodiment, X-direction piezoelectric actuators are provided, respectively, at two opposite edges. Further, Y-direction piezoelectric actuators may be provided, respectively, at two edges orthogonal thereto.

In addition, a Z-axis electrostatic actuator is provided at each probe. This probe is formed in the shape of a cantilever needle (or protrusive portion) to which the principle of AFM is applied, and a needle tip thereof is vertically moved by irregularities of holes or grooves formed on a recording face of the recording medium, thereby reading out information on "1" and "0". The cantilever needle is used in an attractive force area or in a repulsive force area, and data "1" or "0" is detected in response to a variation (position) thereof.

The probe formed at the probe head section and the recording face of the recording medium are maintained at uniform distance (intervals) with the use of a detection result obtained by a position sensor. Among the actuators, the electrostatic actuator adjusts a pressing force between the probe and the recording face and the servo area face and propelling power of a reciprocating movement exerted by the piezoelectric actuator. With the use of such an actuator, proper position detection data (reproduction signal) is read, destined to a servo pattern in which a probe is provided in a servo area. A guide mechanism is formed in an elastic shape such as a spring, and then, the recording medium is elastically supported by a frame member so as to be resistive against operation of the actuator.

The positioning system of the present embodiment includes: a recording medium in which servo areas are formed on both sides; an actuator formed of a piezoelectric material and a metal material; a guide mechanism; a driver for driving the actuator; a control section for controlling the driver; and a position sensor, for example.

The position sensor is provided between the recording medium and the actuator. This sensor defines any reference position (origin of XY coordinate, for example), and then, calculates a current position relative to the origin, a horizontal distance between the current position and a target position, and a distortional quantity inside the X-Y plane (to be obtained by distance difference). The position sensors are disposed at four corners of the recording medium, for example. For each of them, there can be used an electrostatic capacitance type sensor that measures an electrostatic capacity and utilizes a displacement quantity relative to a detection section provided in opposite thereto. In addition, because thermal conductivity is varied due to a change in opposite area, there can be used a heat rate utility sensor or the like that utilizes displacement quantity detection of a detection section provided in opposite thereto, similarly. The position sensor measures a position between a probe and a recording face (on X-Y plane).

In such a configuration, in the case where a pressing force produced by the electrostatic actuator does not work well, the pressing force acting between the piezoelectric actuator and the recording medium weakens, and the generation force transmitted to the recording medium is reduced. On the other hand, in the case where the pressing force of the electrostatic actuator is large, the piezoelectric actuator works so as to be pressed against the recording medium; the interval between the probe and the recording face of the recording medium is adjusted; and then, reciprocating movement using ultrasound is made. The piezoelectric actuator has trade-off that the generation force is large, whereas displacement quantity is small.

In the present embodiment, the operational principle of publicly known ultrasound motor is used for movement of the probe head section and the recording medium. In this operational principle, frictional driving is exerted with the use of ultrasound vibration. An object pressed against a vibration element to which ultrasound is applied is high in ultrasound frequency in comparison with a time constant of motion, so that it comes into contact with a position at which an amplitude of one period of ultrasound exists. If an elliptical motion or a linear reciprocating motion occurs at this contact portion, the object is subjected to thrust force. The speed and displacement quantity in this thrust can control a drive voltage waveform.

In the present embodiment, the recording medium is reciprocatingly moved in the X direction (data direction) within a predetermined range, and then, the probes disposed in a row manner are arranged so as to overlap to the direction orthogonal in column of holes (or groove irregularities) on a recording area in which the reciprocating motion occurs. At this time, position detection is carried out while a servo pattern is defined as a reference so that the probes disposed in a row manner overlap in coincidence with the columns of holes, in particular, no inclination occurs in the data direction; position correction is carried out; and then, recording/reproducing operation is carried out. Therefore, the position detection according to the present embodiment may be position detection for carrying out position correction in the Y direction (track direction), and is different from the conventional detection of the coordinate position (target position) of one point in the XY plane. While, in the present embodiment, the servo areas are provided, respectively, at both sides of one data area, there is no need for always providing them at both sides. For example, at least two servo areas can be disposed between each of a plurality of data areas.

According to the present embodiments described above, a recording medium in which servo areas having feedback information relating to positions are disposed at both ends of a storage area is opposed to a probe head section at which a plurality of probes are disposed in an arrayed manner, and then, either of them is vibrated (reciprocatingly moved) at a predetermined frequency relative to a direction with one degree of freedom. The probe head section is classified into a servo probe responsible for positioning and a recording and reproducing probe responsible for recording and reproducing information. The servo probe is located in the servo area mentioned above. An access is made with the use of a plurality of recording and reproducing probes at the same time, thereby achieving improvement in a transfer rate of a storage system.

According to the embodiments of the present invention, there can be provided an apparatus and method for positioning a probe memory device, including a probe head at which a plurality of probes are disposed in an arrayed manner, wherein the probe head is moved to a precise recording position within a short period of time, achieving a high recording density and a high transfer speed.

What is claimed is:

1. A probe memory device, comprising:
 a recording medium having a square shaped recording area including a plurality of data columns disposed in a predetermined data direction, a first area and a second area provided, respectively, outside of any two opposing sides in the recording area, and a positioning pattern representing feedback information for carrying out positioning and provided in each of the first and second areas;
 a probe head array disposed in opposite to the recording medium and having a plurality of first robes disposed in matrix for recording, reproducing, and erasing information in the recording area, and a second probe for generating a second reproduction signal that indicates a position of the data columns from the positioning pattern of the first and second areas; and
 an actuator which moves a relative position between the recording medium and the probe head array,
 wherein the positioning pattern provided in the first area and the second area includes:
 a first pattern in which a plurality of protrusions having top portions are continuous, the first pattern being arranged in a track direction orthogonal to the data direction; and a second pattern in which a plurality of continuous protrusions similar to the first pattern are arranged and top portions are disposed at intermediate positions between the top portions of the protrusions in the first pattern.

2. The device according to claim 1, wherein in the positioning pattern, the first pattern and the second pattern are paired, and a plurality of pairs are disposed in the first area and the second area.

3. The device according to claim 1, wherein the positioning pattern is made of either a hemispherical protrusion, or a trapezoidal protrusion having a top portion that is flat in a shape viewed in a horizontal direction.

4. The device according to claim 2, wherein the positioning pattern, at the top portion in the protrusion, has a length that is two times or more in integer multiple in the data direction, with respect to a length in the track direction.

5. A probe memory device, comprising:
a recording medium having a square shaped recording area including a plurality of data columns disposed in a predetermined data direction, a first area and a second area provided, respectively, outside of any two opposing sides in the recording area, and a positioning pattern representing feedback information for carrying out positioning and provided in each of the first and second areas;
a probe head array disposed in opposite to the recording medium and having a plurality of first probes disposed in matrix for recording, reproducing, and erasing information in the recording area, and a second probe for generating a second reproduction signal that indicates a position of the data columns from the positioning pattern of the first and second areas; and
an actuator which moves a relative position between the recording medium and the probe head array,
wherein the recording medium is vibrated at a predetermined frequency by means of the actuator section, and reciprocatingly operates along a data direction.

6. A probe memory device, comprising:
a recording medium having a square shaped recording area including a plurality of data columns disposed in a predetermined data direction, a first area and a second area provided, respectively, outside of any two opposing sides in the recording area, and a positioning pattern representing feedback information for carrying out positioning and provided in each of the first and second areas;
a probe head array disposed in opposite to the recording medium and having a plurality of first probes disposed in matrix for recording, reproducing, and erasing information in the recording area, and a second probe for generating a second reproduction signal that indicates a position of the data columns from the positioning pattern of the first and second areas; and
an actuator which moves a relative position between the recording medium and the probe head array,
wherein the positioning pattern in the first area and second area includes:
a first pattern in which the first area and the second area are formed in a laminated structure made of an undercoat electrode layer, a recording layer, and a surface protection layer on a base substrate of the recording medium, a multi-value pulse current whose current value linearly increases and decreases from the surface protection layer with respect to the recording layer is applied while the areas are moved in a track direction orthogonal to the data direction, whereby a material for the recording layer is phase-changed so as to have a pattern that is vertically bent at an acute angle in a depth direction; and
a second pattern arrayed to be vertically bent at an acute angle in the phase-changed depth direction as in the first pattern, the second pattern being formed to have a maximum value at a position whose phase is shifted by 180 degrees with respect to a maximum value in the first pattern.

7. A probe memory device, comprising:
a recording medium having a square shaped recording area including a plurality of data columns disposed in a predetermined data direction, a first area and a second area provided, respectively, outside of any two opposing sides in the recording area, and a positioning pattern representing feedback information for carrying out positioning and provided in each of the first and second areas;
a probe head array disposed in opposite to the recording medium and having a plurality of first probes disposed in matrix for recording, reproducing, and erasing information in the recording area, and a second probe for generating a second reproduction signal that indicates a position of the data columns from the positioning pattern of the first and second areas; and
an actuator which moves a relative position between the recording medium and the probe head array,
wherein a length of the recording area in the data direction has an integer multiple of a length of each of the first and second areas, and the integer multiple number of probes are disposed in the recording area when one probe is disposed in each of the first and second areas, and
scanning is carried out over an entire length of the data area by means of one scan by adjusting to a length of a servo area at the time of reciprocating motion of the recording medium.

8. A probe memory device, comprising:
a recording medium having a square shaped recording area including a plurality of data columns disposed in a predetermined data direction, a first area and a second area provided, respectively, outside of any two opposing sides in the recording area, and a positioning pattern representing feedback information for carrying out positioning and provided in each of the first and second areas;
a probe head array disposed in opposite to the recording medium and having a plurality of first probes disposed in matrix for recording, reproducing, and erasing information in the recording area, and a second probe for generating a second reproduction signal that indicates a position of the data columns from the positioning pattern of the first and second areas;
an actuator which moves a relative position between the recording medium and the probe head array; and
a reading processing circuit including:
a sampling section which inputs a first reproduction signal detected by the first probes based on the positioning pattern, and the second reproduction signal;
a first data processing section which is inputted the first reproduction signal from the sampling section, and distributes and outputs to circuits at a succeeding stage;
a second data processing section which is inputted the second reproduction signal from the sampling section, and distributes and outputs to circuits at a succeeding stage;
an adder circuit which is connected as the succeeding stage of the first data processing section and the second data processing section, and adds the first reproduction signal and the second reproduction signal so as to obtain an additive value;

a subtractor circuit which is connected as the succeeding stage of the first data processing section and the second data processing section, and subtracts the first reproduction signal and the second reproduction signal so as to obtain a subtractive value; and a divider circuit which output the number divided the subtractive value by the additive value.

9. The device according to claim 8, wherein in the case the divider circuit outputs 0, its positioning point is a highest position or a lowest position in movement of a Z axis direction at a tip end of each of the first and second probes.

10. A probe memory device, comprising:

a recording medium having a square shaped recording area including a plurality of data columns disposed in a predetermined data direction, a first area and a second area provided, respectively, outside of any two opposing sides in the recording area, and a positioning pattern representing feedback information for carrying out positioning and provided in each of the first and second areas;

a probe head array disposed in opposite to the recording medium and having a plurality of first probes disposed in matrix for recording, reproducing, and erasing information in the recording area, and a second probe for generating a second reproduction signal that indicates a position of the data columns from the positioning pattern of the first and second areas; and an actuator which moves a relative position between the recording medium and the probe head array, wherein the probe head section is vibrated at the frequency with respect to the recording medium, and at least one probe of the probe head section is opposed to the positioning pattern.

11. A positioning method of a probe memory device, comprising:

the method using the probe memory device including: a probe head section at which a plurality of probes are disposed in an arrayed manner; and a recording medium on which information is written, read out, and erased by means of the probes disposed in opposite to the probe head section;

reciprocatingly moving the recording medium at a predetermined frequency with respect to one direction of degree of freedom;

approaching the probes to positioning patterns of at least two columns, the positioning patterns being disposed in two servo areas provided at both sides on the recording medium sandwiching a recording area therebetween;

generating a first reproduction signal and a second reproduction signal having saw-tooth waves whose phases are different from each other by 180 degrees; and dividing a subtractive value between the first reproduction signal and the second reproduction signal by an additive value of the first reproduction signal and the second reproduction signal, and when 0 is set, judging a proper position for carrying out the writing, the readout, and the erasing of the information.

12. The method according to claim 11, wherein when the probes are approaching the positioning patterns, plural times of information acquisition are carried out with respect to the positioning patterns, and the first reproduction signal and the second reproduction signal are generated plural times.

* * * * *